United States Patent [19]

Nyfeler

[11] 4,125,760
[45] Nov. 14, 1978

[54] RELIEF PATTERN IMPRESSING APPARATUS

[75] Inventor: Alex Nyfeler, Baar, Switzerland

[73] Assignee: LGZ Landis & Gyr Zug AG, Zug, Switzerland

[21] Appl. No.: 810,528

[22] Filed: Jun. 27, 1977

[30] Foreign Application Priority Data

Aug. 3, 1976 [CH] Switzerland ............... 9889/76

[51] Int. Cl.$^2$ ............................................. B29C 17/00
[52] U.S. Cl. .................................... 219/388; 219/216; 219/243; 219/244; 350/3.61; 350/3.69
[58] Field of Search .......... 219/216, 243, 244, 388 W, 219/155, 156, 84; 264/1; 350/3.61, 3.69; 156/272, 274, 278; 100/93 R

[56] References Cited

U.S. PATENT DOCUMENTS

| | | | |
|---|---|---|---|
| 2,355,391 | 8/1944 | Nelson et al. ................... | 219/358 |
| 2,556,008 | 6/1951 | Spalding ........................... | 219/244 |
| 2,858,633 | 11/1958 | Kane ................................. | 219/216 |
| 3,367,261 | 2/1968 | Kashiwagi ....................... | 219/243 |
| 3,666,247 | 5/1972 | Banks ............................... | 219/388 W |
| 3,758,649 | 9/1973 | Frattarola ........................ | 264/1 |
| 3,882,207 | 5/1975 | Hannan et al. .................. | 264/1 |

*Primary Examiner*—Elliot A. Goldberg
*Assistant Examiner*—Bernard Roskoski
*Attorney, Agent, or Firm*—Morgan, Finnegan, Pine, Foley & Lee

[57] ABSTRACT

An apparatus for impressing relief patterns of high resolution, particularly phased holograms or phased diffraction gratings, in a thermoplastic information carrier, comprises a heatable impressing matrix in strip form, which carries the relief pattern and which, together with the information carrier, is passed between two calender rollers, the impressing matrix being adapted to be heated by a current flowing through it.

6 Claims, 2 Drawing Figures

RELIEF PATTERN IMPRESSING APPARATUS

BACKGROUND OF THE INVENTION

1. Field of the Invention:

This invention relates to an apparatus for impressing relief patterns of high resolution, particularly phased holograms or phased diffraction gratings, in a thermoplastic information carrier.

2. Description of the Prior Art

It is known to store information in the form of relief patterns of high resolution, such as phased holograms, phased diffraction gratings and the like, on thermoplastic carrier material. The relief pattern is impressed in the thermoplastic carrier by applying pressure and heat. The carrier may be in card or strip form, depending on its purpose. The relief patterns impressed, containing, for example, video information or information about genuineness, can be optically machine-read.

In a known apparatus for impressing phased holograms, a thermoplastic information carrier and an impressing matrix, in the form of an endless strip carrying the hologram relief pattern, are passed together through two calender rollers. One of the two calender rollers is heated, and during its passage between the rollers the thermoplastic film is heated to an appropriate temperature and subsequently separated from the impressing matrix. This arrangement enables the material to pass through at relatively high speed. However, the indirect heating of the impressing matrix by the calender roller has been found to bring various disadvantages. The heat capacity of the heated calender roller is necessarily relatively large, which means that when the impressing apparatus is put into operation the impressing matrix only reaches the desired temperature after a fairly long heating-up time. For example, there may be long periods of waiting when work has been interrupted, and a high reject rate may sometimes have to be accepted in the starting-up phase. Similarly, the impressing temperature can only be changed slowly, for example, when changing to a different carrier material. Moreover, a large amount of heat energy is required, particularly as the impressing matrix is heated over its entire width, although in most cases only a relatively narrow strip in the middle of the impressing matrix carries a relief pattern.

SUMMARY OF THE INVENTION

Accordingly, it is an object of this invention to provide an apparatus for impressing relief patterns in which these defects are substantially overcome.

Another object of this invention is to provide an apparatus for impressing relief patterns wherein a selected portion of the impressing matrix can be heated rapidly to the desired temperature.

A further object of this invention is to provide an apparatus for impressing relief patterns wherein the temperature of the impressing matrix can be controlled easily and with only a short time lag.

According to this invention there is provided an apparatus for impressing relief patterns wherein the impressing matrix is adapted to be heated by a current flowing through it.

The above, and other objects, features and advantages of this invention will be apparent in the following detailed description of an illustrative embodiment which is to be read in connection with the accompanying drawings.

DESCRIPTION OF THE PREFERRED EMBODIMENT

Figure 1:
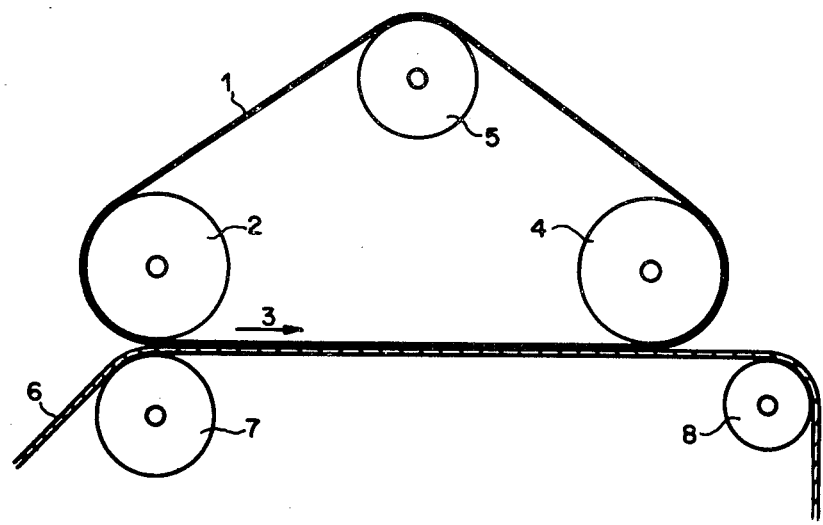
FIG. 1 shows diagrammatically an impressing apparatus.

An embodiment of this invention will be described with reference to FIGS. 1 and 2, in which corresponding parts are denoted by the same reference numerals on both drawings.

Figure 2:
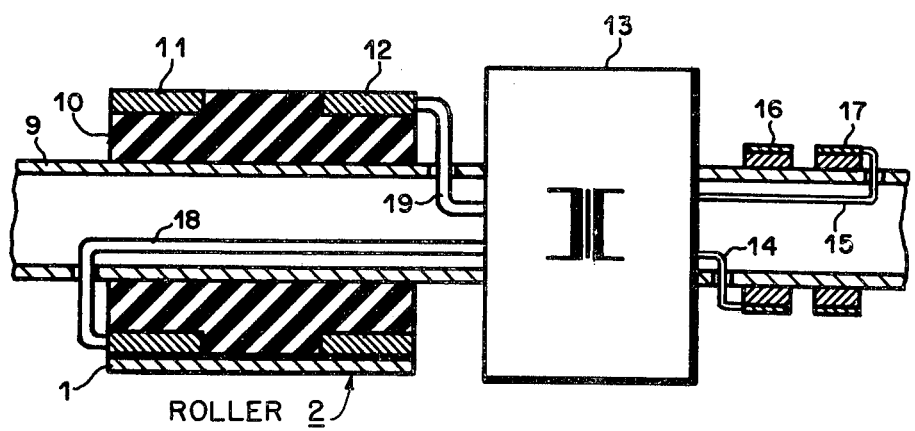
FIG. 2 shows diagrammatically a calender roller with an attached transformer.

Referring to FIG. 1, 1 represents an impressing matrix which comprises an electric conductor in the form of an endless strip having a relief pattern formed in its outer surface. The relief pattern preferably comprises one or more phased holograms or phased diffraction gratings, in which case the distance between the lines of the grating may be of the order of a few microns or less. Methods of making impressing matrices of metal with relief patterns of this type are known and therefore need not be explained in detail here. For example, a nickel copy, which can be used as impressing matrix 1, may be made from an original hologram by chemical or electrolytic coating.

Impressing matrix 1 is driven by a rigidly mounted, motor-driven calender roller 2 in the direction of arrow 3, and it also runs over direction changing rollers 4 and 5. An information carrier 6 in the form of a strip of thermoplastic material is passed, together with impressing matrix 1, between calender roller 2 and a further calender roller 7. Calender roller 7 is mounted resiliently and presses information carrier 6 against impressing matrix 1, thereby impressing the relief pattern on impressing matrix 1 in information carrier 6 (impressing matrix 1 being heated in the manner described below). Information carrier 6 remains in close contact with impressing matrix 1 for a predetermined distance, during which it cools, and is then separated from the impressing matrix 1 and passes over a direction changing roller 8 to a winding bobbin (not shown).

An electric heating current flowing through a longitudinal element of impressing matrix 1 heats the impressing element to the temperature required for impressing, before the impressing element actually passes through the nip between calender rollers 2 and 7. The arrangement is preferably such that the electric heating current flows in impressing matrix 1 transversely to the direction of its movement. This makes it possible to heat selectively only the inner part of the impressing matrix 1, that is the part carrying the relief pattern, so that when the impressing matrix 1 emerges from the calender rollers 2 and 7, heat flows from the heated part of the longitudinal element to the unheated outer parts and the impressed relief pattern sets rapidly, producing patterns which are extremely true to shape.

The heat is supplied to impressing matrix 1 through calender roller 2. FIG. 2 shows in section a calender roller 2 of appropriate construction. The calender roller 2 comprises a hollow cylinder 10, which is fixed on a hollow shaft 9 and which is made of an electrically non-conductive material of low thermal conductivity, and two metal rings 11 and 12 arranged on the outer, recessed ends of the hollow cylinder 10. The outer cylindrical surfaces of metal rings 11 and 12 are flush with the exposed cylindrical surface of the hollow cylinder 10.

A transformer 13 is arranged on hollow shaft 9 and is joined to the calender roller 2 to prevent relative rotation. The primary winding of the transformer 13 is connected by leads 14 and 15 to the slip rings 16 and 17, and the secondary winding is connected by leads 18 and 19 to metal rings 11 and 12. Slip rings 16 and 17 are connected to a current source (not shown) by sliding contacts such as brushes (also not shown).

The longitudinal element of impressing matrix 1 which is in close contact with the outer surface of calender roller 2 has the secondary current of the transformer 13 flowing through is transversely to its direction of movement. This rapidly heats the central part of the element, located between metal rings 11 and 12. By controlling the voltage and/or current of the current source it is possible to adapt the temperature to the existing requirements virtually without any delay.

The transformer 13, which has a high-current output, avoids the necessity of transferring a large current from the stationary current source to rotating calender roller 2.

If the impressing matrix 1 passes through at high speed, heating with a low frequency alternating current, for example, 50 Hz, may lead to periodic fluctuations in temperature longitudinally of impressing matrix 1. In order to avoid this, it is preferable to use an alternating current source at a frequency within the audio range.

Although an illustrative embodiment of the invention has been described in detail herein with reference to the accompanying drawings, it is to be understood that the invention is not limited to this precise embodiment, and that various changes and modifications can be effected therein by one skilled in the art without departing from the scope and spirit of the invention as defined by the appended claims.

What is claimed is:

1. An apparatus for impressing relief patterns of high resolution, such as phased holograms or phased diffraction gratings, in a thermoplastic information carrier, comprising:
   an impressing matrix in strip form which carries the relief pattern to be impressed in said information carrier;
   two calender rollers;
   means for passing said impressing matrix in contact with said information carrier between said two calender rollers; and
   means to pass an electric current through said impressing matrix in the direction transverse to the direction of movement of said strip to heat said impressing matrix to a temperature sufficient to impress said relief pattern in said information carrier.

2. An apparatus according to claim 1, wherein said two calender rollers comprise a first calender roller which contacts said impressing matrix and a second calender roller which contacts said information carrier, when said impressing matrix together with said information carrier are passed therebetween; and wherein said electric current passes through the portion of said impressing matrix which is in contact with said first calender roller; and further comprising means to cause said two calender rollers to revolve during the impressing process.

3. An apparatus according to claim 2, wherein the outer surface of said first calender roller comprises two axially disposed outer cylindrical portions of electrically conducting material and an axially disposed inner cylindrical portion of electrically insulating material separating said outer cylindrical portions; and wherein said means to pass an electric current through said impressing matrix comprises a current source connected to said outer cylindrical portions.

4. An apparatus according to claim 3, wherein said first calender roller comprises a hollow cylinder of electrically insulating material and low thermal conductivity, and a shaft on which said cylinder is mounted, the outer surface of said cylinder forming said inner cylindrical portion and the two axially disposed end portions of said outer surface of said cylinder being recessed to accommodate respective metal rings having respective outer cylindrical surfaces which lie flush with the surface of said inner cylindrical portion and respectively form said outer cylindrical portions.

5. An apparatus according to claim 4, wherein said means to pass an electric current through said impressing matrix comprises a transformer mounted for rotation with said first calender roller and having a primary winding and a secondary winding, said primary winding being connected to said current source by sliding contacts and said secondary winding being connected to said outer cylindrical portions.

6. An apparatus according to claim 5, in which said current source is an alternating current source having a frequency within the audio range.

* * * * *